United States Patent
Song

(10) Patent No.: US 6,363,834 B1
(45) Date of Patent: Apr. 2, 2002

(54) MULTIPURPOSE FRYER

(76) Inventor: Young Joo Song, 97-64 Eungam-Dong, Eunpyung-Ku, Seoul (KR)

( * ) Notice: Subject to any disclaimer, the term of this patent is extended or adjusted under 35 U.S.C. 154(b) by 0 days.

(21) Appl. No.: 09/925,352

(22) Filed: Aug. 9, 2001

(30) Foreign Application Priority Data

Aug. 26, 2000 (KR) .............................. 00-24248

(51) Int. Cl.[7] .......................... A47J 37/00; A47J 37/12; A47J 27/026
(52) U.S. Cl. ............................ 99/330; 99/331; 99/403; 126/376.1; 126/391.1
(58) Field of Search .......................... 99/327, 330–333, 99/403–408, 410–418; 126/391.1, 350 R, 345, 392, 392.1, 373.1, 375.1, 376.1; 219/438; 210/540, 167, DIG. 8; 426/231, 233, 438

(56) References Cited

U.S. PATENT DOCUMENTS

| | | | | |
|---|---|---|---|---|
| 4,228,730 A | * | 10/1980 | Schindler et al. | ............. 99/407 |
| 4,372,980 A | * | 2/1983 | Luebke et al. | ............. 426/231 |
| 4,580,549 A | | 4/1986 | Sato | |
| 4,603,622 A | | 8/1986 | Beck | |
| 4,639,213 A | * | 1/1987 | Simpson | ..................... 431/326 |
| 4,660,542 A | * | 4/1987 | Scherer | ....................... 99/403 |
| 4,684,412 A | * | 8/1987 | Fritzsche | ................. 99/330 X |
| 4,848,318 A | * | 7/1989 | Brewer | ..................... 126/391.1 |
| 4,913,041 A | * | 4/1990 | Taber et al. | ............. 126/391.1 |
| 4,923,705 A | * | 5/1990 | Mottur et al. | ........... 426/438 X |
| 5,185,168 A | * | 2/1993 | Takahashi | ................... 426/233 |
| 5,209,218 A | * | 5/1993 | Daneshvar et al. | ....... 99/403 X |
| 5,417,202 A | * | 5/1995 | Cote | ........................ 99/403 X |
| 5,490,449 A | * | 2/1996 | Meister et al. | ................ 99/403 |
| 5,632,266 A | | 5/1997 | Sato | |
| 5,706,717 A | * | 1/1998 | Barner | ........................ 99/330 |
| 6,131,564 A | | 10/2000 | Song | |

* cited by examiner

Primary Examiner—Timothy F. Simone
(74) Attorney, Agent, or Firm—George L. Boller

(57) ABSTRACT

The present invention relates to a multipurpose fryer that can be used for cooking various foods. The fryer is composed of; a heater arranged in lower portion in the fryer; a net screen arranged over the heater; and a control unit arranged at an upper portion on the fryer, which is connected to both terminals of the heater to control the power supply; characterized by a space formed on an inclined mid-bottom of the fryer, which has an outlet communicated with a valve provided on an outer side of the fryer; and an auxiliary container defined as space beneath the mid-bottom and upper portion of end-bottom of the fryer and is extended to vertical direction along the side wall of the fryer, wherein its open portion is disjointably fitted by the control unit, its inside is provided with a auxiliary heater connected to the control unit, and a side of its lower portion is communicated with another valve provided on another side of the fryer. The fryer enables reducing energy consumption, thereby it can supply drinking water or washing water that is heated up by heat release from the fryer. Besides, using an additional pot for boiling or keeping warm food can also use it for multipurpose cooker and use it for water heater at need conveniently.

2 Claims, 2 Drawing Sheets

MULTIPURPOSE FRYER

FIELD OF INVENTION

The present invention relates to a fryer for cooking food, and more particularly to a multipurpose fryer having a auxiliary container provided at a side of the fryer to fill water therein, whereby can supply drinking water or washing water that is heated up by heat release from the fryer, which can be used to boil and to keep boiling the food by utilizing additional a cooking pot, and which may be used for supplier hot water if circumstances require.

BACKGROUND OF INVENTION

The fryer for home-life or professional is typically formed cubic or cylindrical, which heated up the oil therein to fry the food by 160 to 220° C., using such a method that there is installed gas burner beneath the fryer or installed heater inside it, whereas fragmentary chips of frying food is collected on the bottom of the fryer.

The common fryer is simply used to fry the food with hot oil, and therefore the heat release therefrom is wasted without reuse, causing excessive energy consuming.

SUMMARY OF INVENTION

Therefore, the present invention is designed from this viewpoint, it is the object of this invention to provide a multipurpose fryer for saving energy by using heat release from the fryer to heat up contained water in an auxiliary container, which can be used to supply drinking or washing hot water, and be used to boil and keep boiling the food by utilizing an additional cooking pot, and which may be used for supplier hot water if circumstances require.

To achieve the above object, there is provided a fryer comprising, a heater arranged in lower portion in the fryer;

a net screen arranged over the heater; and a control unit arranged at an upper portion on the fryer, which is connected to both terminals of the heater to control the power supply; characterized by, a space formed on an inclined mid-bottom of the fryer, which has an outlet communicated with a valve provided on an outer side of the fryer; and an auxiliary container defined as space beneath the mid-bottom and upper portion of end-bottom of the fryer and is extended to vertical direction along the side wall of the fryer, wherein its open portion is disjointably fitted by the control unit, its inside is provided with a auxiliary heater connected to the control unit, and a side of its lower portion is communicated with another valve provided on another side of the fryer.

According to another aspect of the invention, there is provided a fryer further characterized by being combined fitably an additional cooking pot with its lid to be used to boil and keep boiling the food, as well as the fryer is used to cook the frying food with oil.

DETAILED DESCRIPTION FOR PREFERRED EMBODIMENT

Hereinafter, preferred embodiments of the present invention will be explained in detail with reference to the accompanying drawings.

Figure 1:
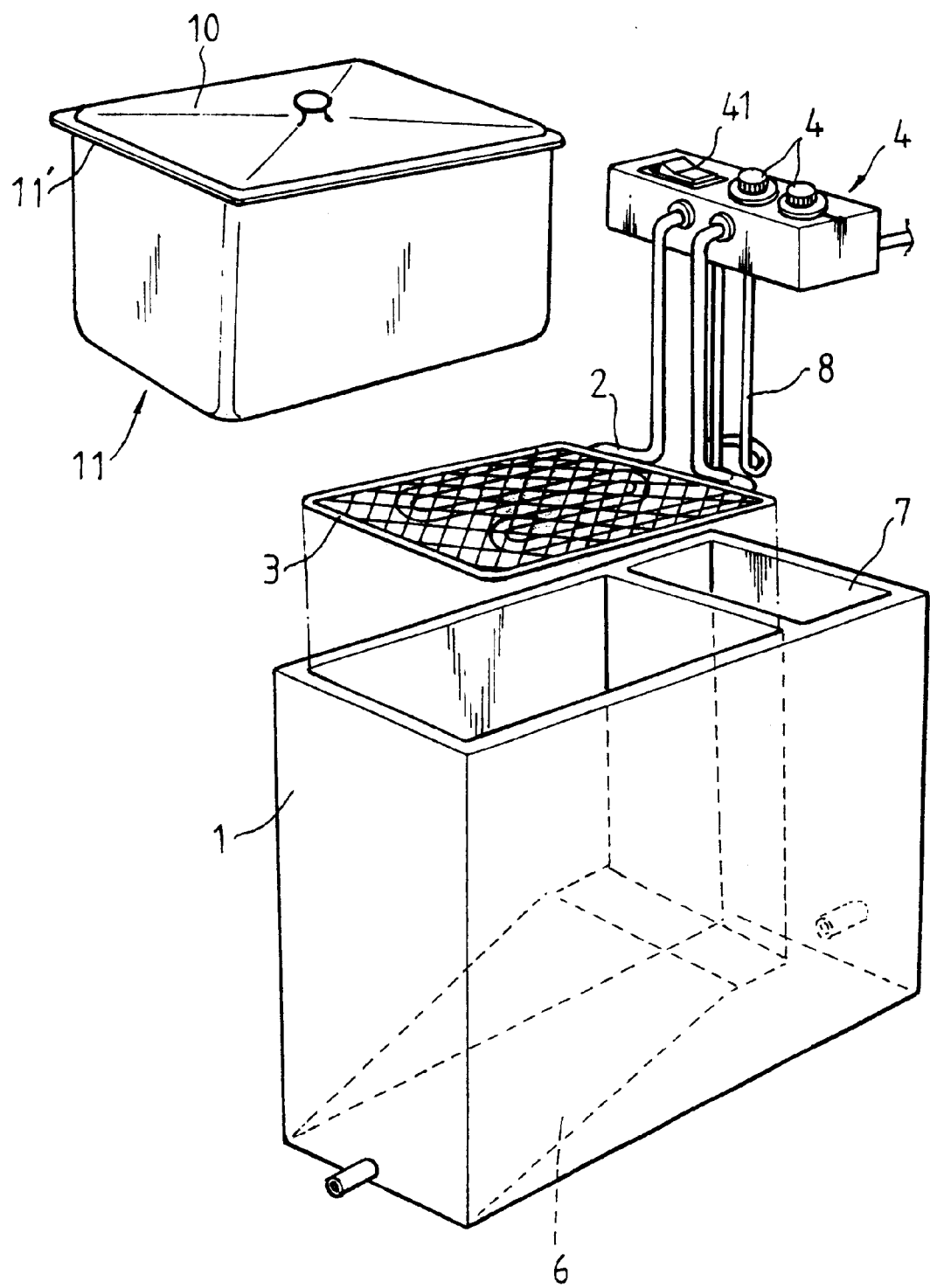
FIG. 1 is a perspective illustration of a disassembled fryer according to an embodiment of the present invention.
Figure 2:
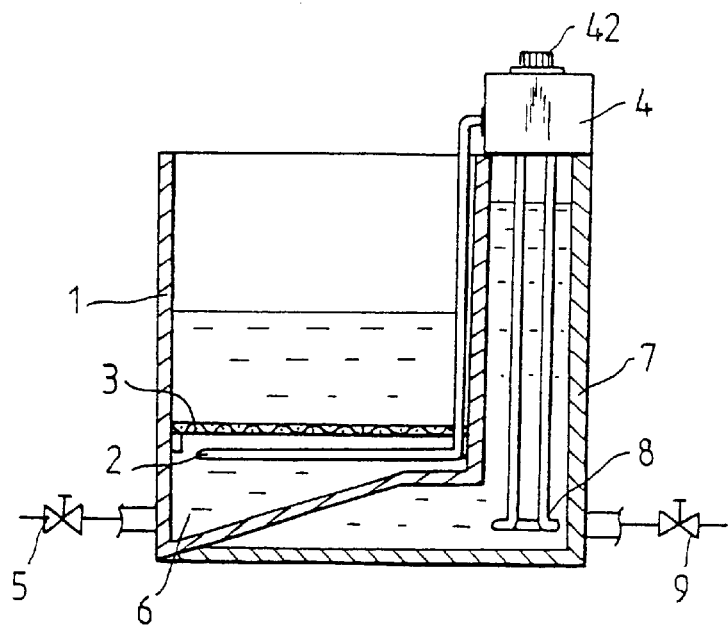
FIG. 2 is a vertical sectional view of the fryer of FIG. 1.

FIG. 1 is a perspective illustration of a disassembled fryer according to an embodiment of the present invention, and FIG. 2 is a vertical sectional view of the fryer of FIG. 1, wherein reference numerals (1), (4) and (7) indicate a fryer, a control unit and an auxiliary container, respectively.

The fryer(1) according to the present invention is schematically a hexahedral frying pot having open top, including a heater(2) arranged in lower portion in the pot and a net screen(3) over the heater, as shown in FIGS. 1 and 2. Further, there is an inclined mid-bottom under the heater(2), in order to discharge easily fragmentary chips, used oil or water remained therein, through an outlet provided at one side of a space(6) up the mid-bottom and then communicated with a valve(5) provided on the outer side of the fryer.

An auxiliary container(7) is defined as space beneath the mid-bottom and upper portion of end-bottom of the fryer(1), is extended to vertical direction along the sidewall of the fryer, and is opened upward to level with the fryers. Similarly to the fryer, the auxiliary container including an auxiliary heater(8) arranged in it's inside is connected to a second valve(9) provided on it's outside.

Further, a control unit(4) comprising a switch(41) and two regulator(42) is provided on the open of the auxiliary container(7), which is connected to both terminals of the heater(2) in the fryer(1) at a side of the unit while it is connected to both terminals of auxiliary heater(8) in the auxiliary container(7), so as to control the electric power supplying to each heater by a on/off switch(41) for supplying the power and two heating regulator(42) for controlling the power. The control unit(4) may be formed unity with the fryer or be assembled separably with it.

Figure 3:
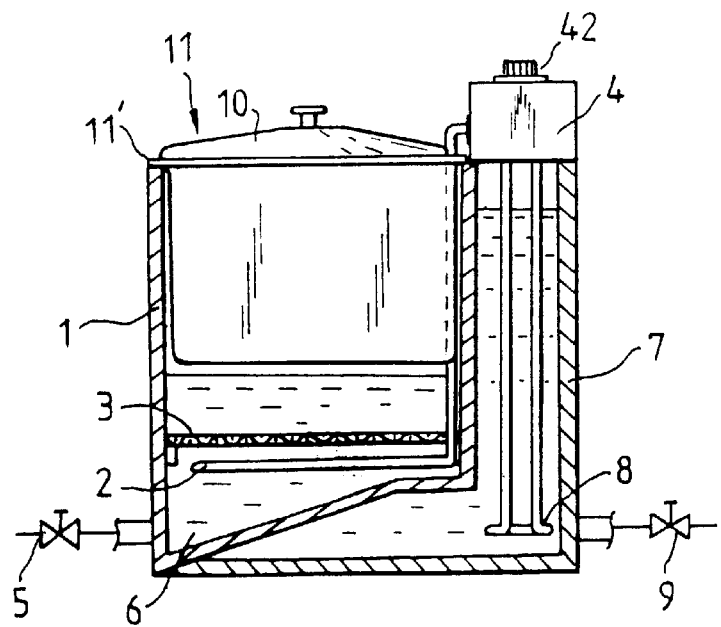
FIG. 3 is a vertical sectional view of a fryer combined with a cooking pot according to another embodiment of the present invention.

In the meantime, the fryer may be also combined an additional cooking pot(11) with its lid(10). The additional pot(11) is installed on or adjacent to the net screen(3) and the open of the fryer is sealed by flange(11') of the pot(11), as shown in FIG. 3. Accordingly, the contained food in the additional pot(11) can be boiled and kept boiling by hot vapor in the fryer.

In follows, the fryer above-mentioned will be described with respect to practical application.

For frying food with oil, a cook has to fill the fryer(1) about ⅔ with oil and fill the auxiliary container(7) with water as much as desired, as shown in FIG. 3, and then supply the electric power thereby operating the switch(41) in control unit(4) connected to both terminals of the heater(2). Then the oil in the fryer is heated up by heater(2) and is maintained by 160~220° C., or by other suitable temperature, at last the cook begins frying.

While the hot oil in the fryer(1) is maintained by suitable temperature, so as to be able to be fry food, the water in the auxiliary container(7) is also kept warming. Accordingly, the water can be supplied as hot water using for drinking or for washing, through the valve(9).

In the meantime, if it is required to boiling or to keeping warm food utilizing the additional pot(11), first of all, one discharges the oil in the fryer(1) through the valve(5) and clean the inside. Next he/she fills the fryer(1) with water over the net screen(3) and then combines the additional pot(11) filled with food (e.g. boiled cereal, meat, rice cake, baked bread, etc). Then he/she boils the contained water in fryer(1) by switch on the heater, so that the food in the pot is boiled or maintained warm with hot vapor, thereby operating the control unit(4). In this case, the water contained the auxiliary container(7) is usable for hot water, as the case for frying.

Besides, it is possible that one fills the fryer(1)/the additional pot(11) full with water and operates the control unit(4) to supply electric power in the heater(2)/the auxiliary heater (8) simultaneously to maintain boiling water by desired temperature, thus he/she can get a supply of warm water.

The multipurpose fryer having construction such as abovementioned enables reducing energy consumption, thereby it can supply drinking water or washing water that is heated up by heat release from the fryer. Using an additional pot for boiling or keeping warm food can also use it for multipurpose cooker and use it for water heater at need conveniently.

The above described and illustrated feature of embodiments of the invention can be used separately or in combination. While specific embodiments of the invention have been described above, it will be appreciated that the invention may be practiced otherwise than as described. The description is not intended to limit the invention.

What is claimed is:

1. A multipurpose fryer comprising,
    a heater arranged in lower portion in the fryer;
    a net screen arranged over the heater; and
    a control unit arranged at an upper portion on the fryer, which is connected to both terminals of the heater to control the power supply; characterized by,
    a space formed on an inclined mid-bottom of the fryer, which has an outlet communicated with a valve provided on an outer side of the fryer; and
    an auxiliary container defined as space beneath the mid-bottom and upper portion of end-bottom of the fryer and is extended to vertical direction along the side wall of the fryer, wherein its open portion is disjointably fitted by the control unit, its inside is provided with a auxiliary heater connected to the control unit, and a side of its lower portion is communicated with another valve provided on another side of the fryer.

2. A multipurpose fryer according to claim 1 further comprising an additional cooking pot with its lid, which can be combined with the fryer.

* * * * *